(12) United States Patent
Henriksson

(10) Patent No.: US 8,758,016 B1
(45) Date of Patent: Jun. 24, 2014

(54) VEHICLE DRIVER AND COMBAT SITUATION SIMULATOR

(76) Inventor: Ulf Henriksson, Bell Canyon, CA (US)

( * ) Notice: Subject to any disclaimer, the term of this patent is extended or adjusted under 35 U.S.C. 154(b) by 152 days.

(21) Appl. No.: 13/031,026

(22) Filed: Feb. 18, 2011

Related U.S. Application Data

(60) Provisional application No. 61/306,422, filed on Feb. 19, 2010.

(51) Int. Cl.
*G09B 19/16* (2006.01)

(52) U.S. Cl.
USPC .................................. 434/29; 434/62

(58) Field of Classification Search
USPC .............................. 434/29–71; 703/7; 482/57
See application file for complete search history.

(56) References Cited

U.S. PATENT DOCUMENTS

| | | | |
|---|---|---|---|
| 6,106,298 A * | 8/2000 | Pollak | 434/29 |
| 6,354,838 B1 * | 3/2002 | Tagge et al. | 434/62 |
| 2007/0020587 A1 * | 1/2007 | Seymore et al. | 434/29 |

* cited by examiner

*Primary Examiner* — Timothy A Musselman
(74) *Attorney, Agent, or Firm* — Koppel, Patrick, Heybl & Philpott; Michael J. Ram

(57) ABSTRACT

A system for simulating the complete operation of a vehicle, particularly a military vehicle, and to provide a simultaneous, integrated vehicle training environment for all of the normal occupants of the vehicle includes a training vehicle with all of the hardware for the operation and support of the vehicle in its normal field operation. The system also has the capability to simulate various different exterior environments along with a broad range of common battlefield conditions. Included is a roll over cradle, a pitch cradle moveably mounted on the a roll over cradle, a simulation vehicle that is substantially the same, at least in its interior, as the vehicle being simulated including operational equipment duplicating or simulating the equipment that each team member would use in performing their individual team function, the simulation vehicle mounted on the pitch cradle, a steering wheel, brake and gas pedal system including a force feedback mechanism which simulates operation and movement of the vehicle over the terrain in conditions being simulated, and numerous effect devices mounted in or on the simulation vehicle to provide to the individuals in the simulation vehicle various environmental effects and a computer based system programmed for controlling the operation of the system and to provide training situations.

6 Claims, 16 Drawing Sheets

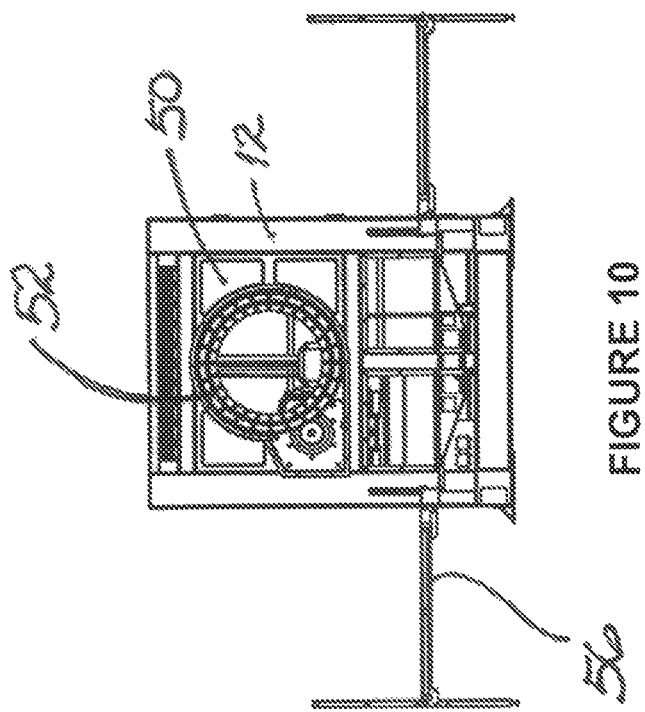
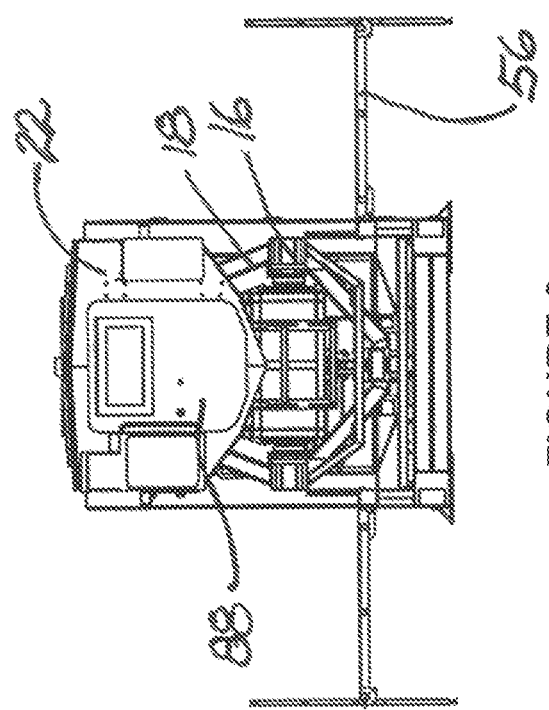

VEHICLE DRIVER AND COMBAT SITUATION SIMULATOR

This application claims benefit of U.S. Provisional Patent Application 61/306,422 filed Feb. 19, 2010.

BACKGROUND

The US military has the need to train soldiers prior to sending them out in actual vehicles and real/combat situations. They currently have numerous specific trainers/simulators that provide, as an example, specific training for Drivers, Truck Commanders, CROWS Gunners, Grenade Gunners, Radio Operators, FBCB2 Operators, Jammer Operators, Crew, and roll over egress training. However, these are independent trainers/simulators and do not operate as an integrated system combining all of the desired functions and their interactions. As such they are intended to train specific individuals to perform for specific tasks or functions and are not intended, nor do they have the capability, of training a team of individuals, all of which have different or overlapping tasks intended to support a mission of the group as a whole. For example, a trainer/simulator is not available for use in training, at the same time, the members of a team of individuals so as to simulate the interactive functions of an assault team riding in a single vehicle as part of an assault mission.

SUMMARY

Described herein is an example of a system which includes all of the hardware, including the vehicle itself, for the operation and support of a robust integrated vehicle training environment simulator. The specific embodiment described herein is a simulator, referred to herein also as the Transportable, Reconfigurable, Integrated Crew Trainer (TRICT), which provides vehicle crew trainer and includes a Common Remotely Operated Weapons Station (CROWS) Trainer. The concepts and designs disclosed herein can be used with a variety of old, current and future vehicle designs as a training device for the whole team of individuals that would normally be carried in that vehicle. It also has the capability to simulate various different exterior environments along with a broad range of common battlefield conditions.

The simulator includes, but is not limited to, a motion bed platform that can function in a 0-360° orientation with the flexibility to use interchangeable cab and vehicle configurations. It provides integrated training of all crew members at the various crew positions along with all crew functions in one trainer. As a result, it provides a highly realistic training environment as a low-cost alternative to battlefield training.

BRIEF DESCRIPTION OF DRAWINGS

FIG. 9 is an end view of the vehicle and frame taken along line 9-9 of FIG. 4.

FIG. 10 is an end view of the frame taken along line 10-10 of FIG. 4.

DETAILED DISCUSSION

Figure 1:
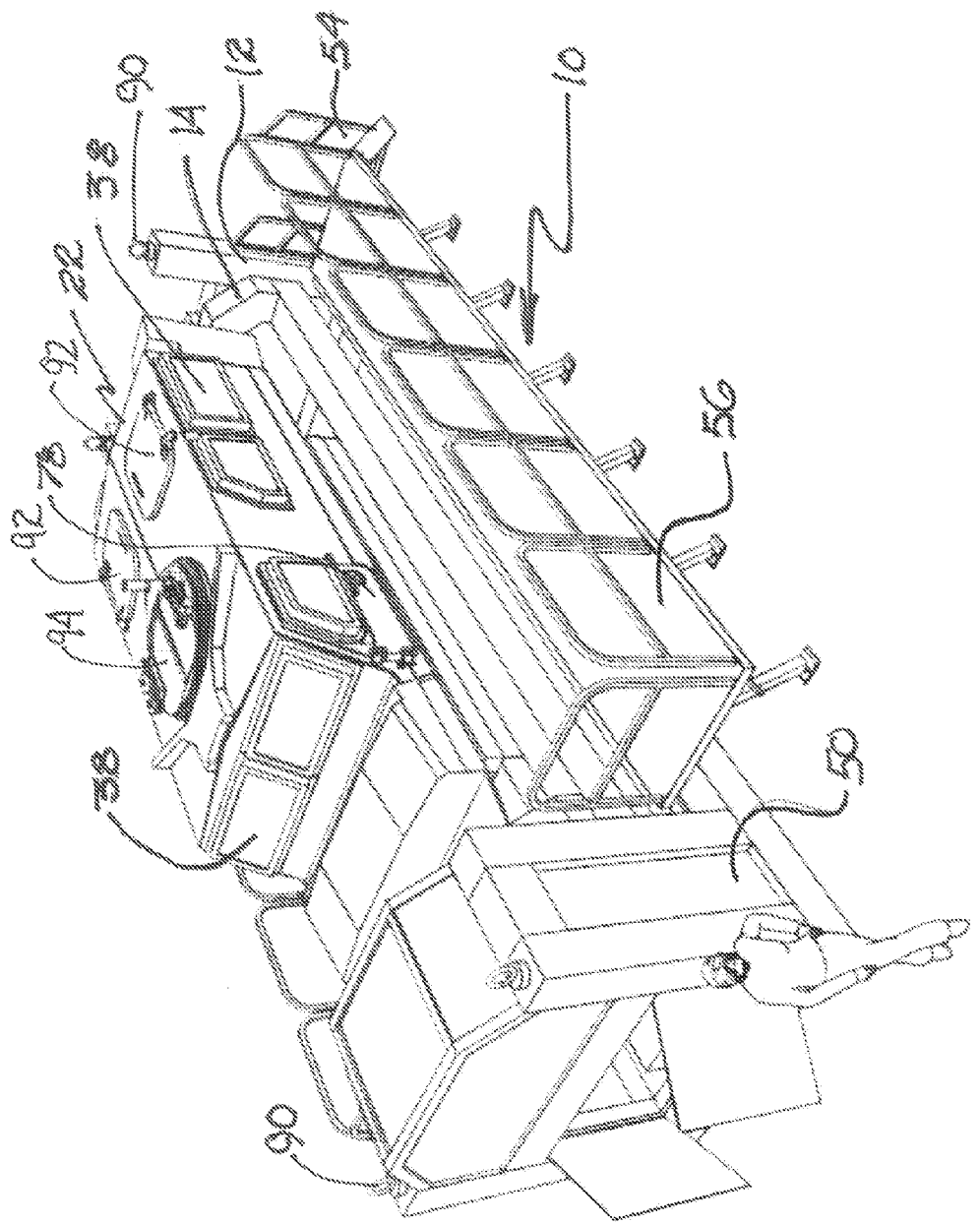
FIG. 1 is a front top perspective view of an embodiment of a vehicle simulator including a simulator frame incorporating features of the invention.
Figure 2:
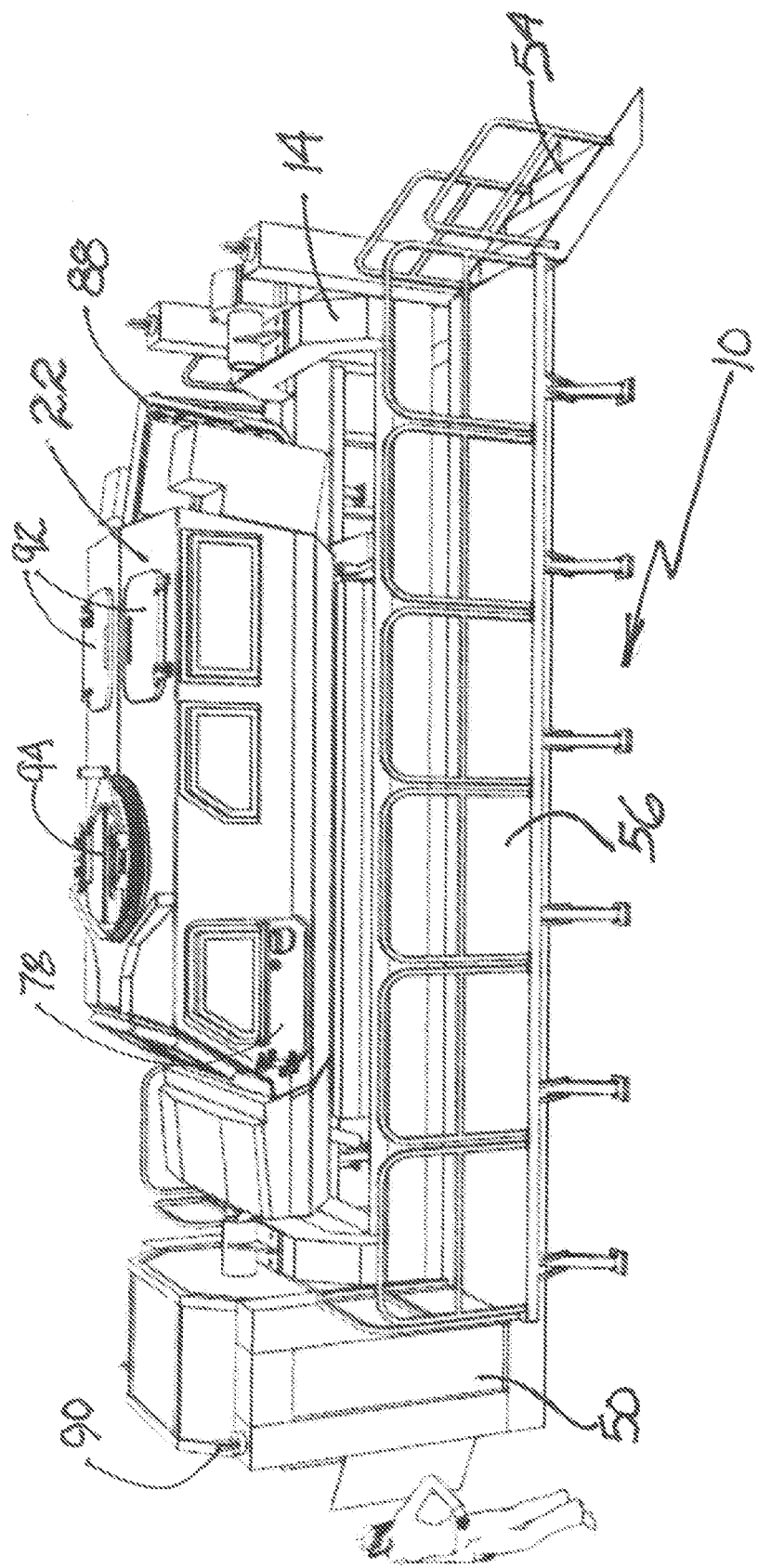
FIG. 2 is a side perspective view of the vehicle simulator including a simulator frame of FIG. 1.
Figure 3:
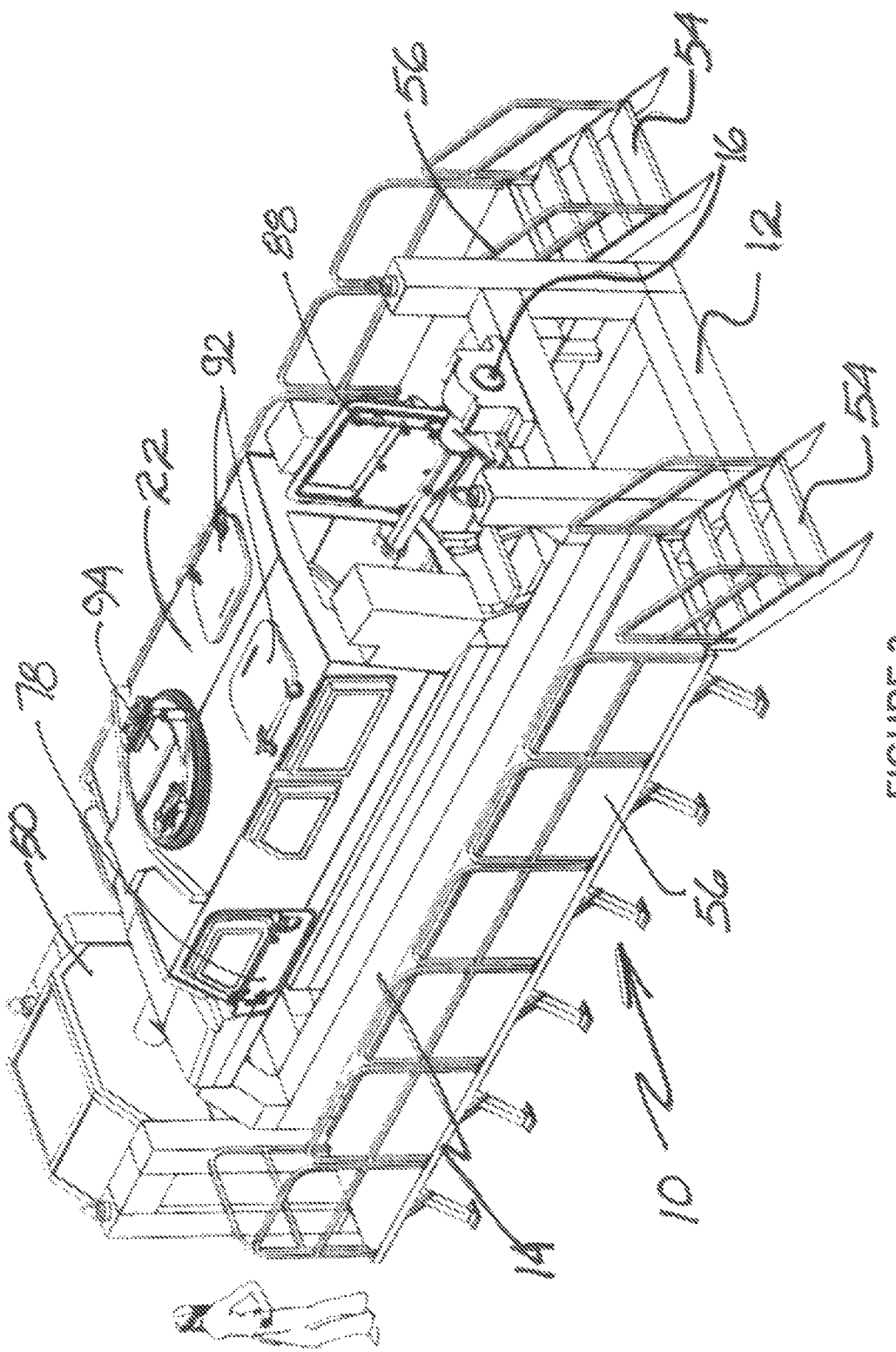
FIG. 3 is a rear top perspective view of the vehicle simulator including a simulator frame of FIG. 1.
Figure 4:
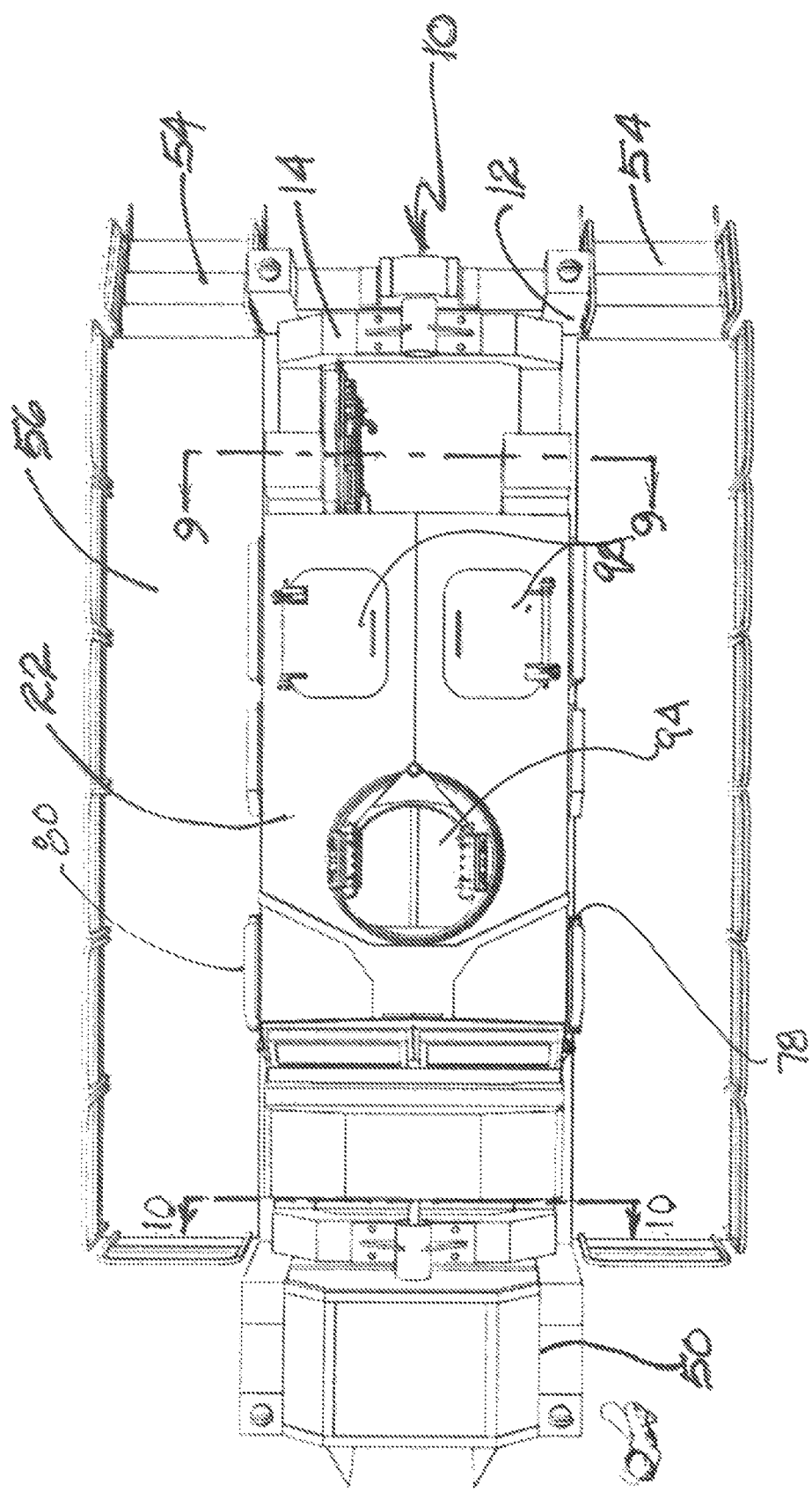
FIG. 4 is a top perspective view of an embodiment of a vehicle simulator including a simulator frame incorporating features of the invention of FIG. 1.
Figure 5:
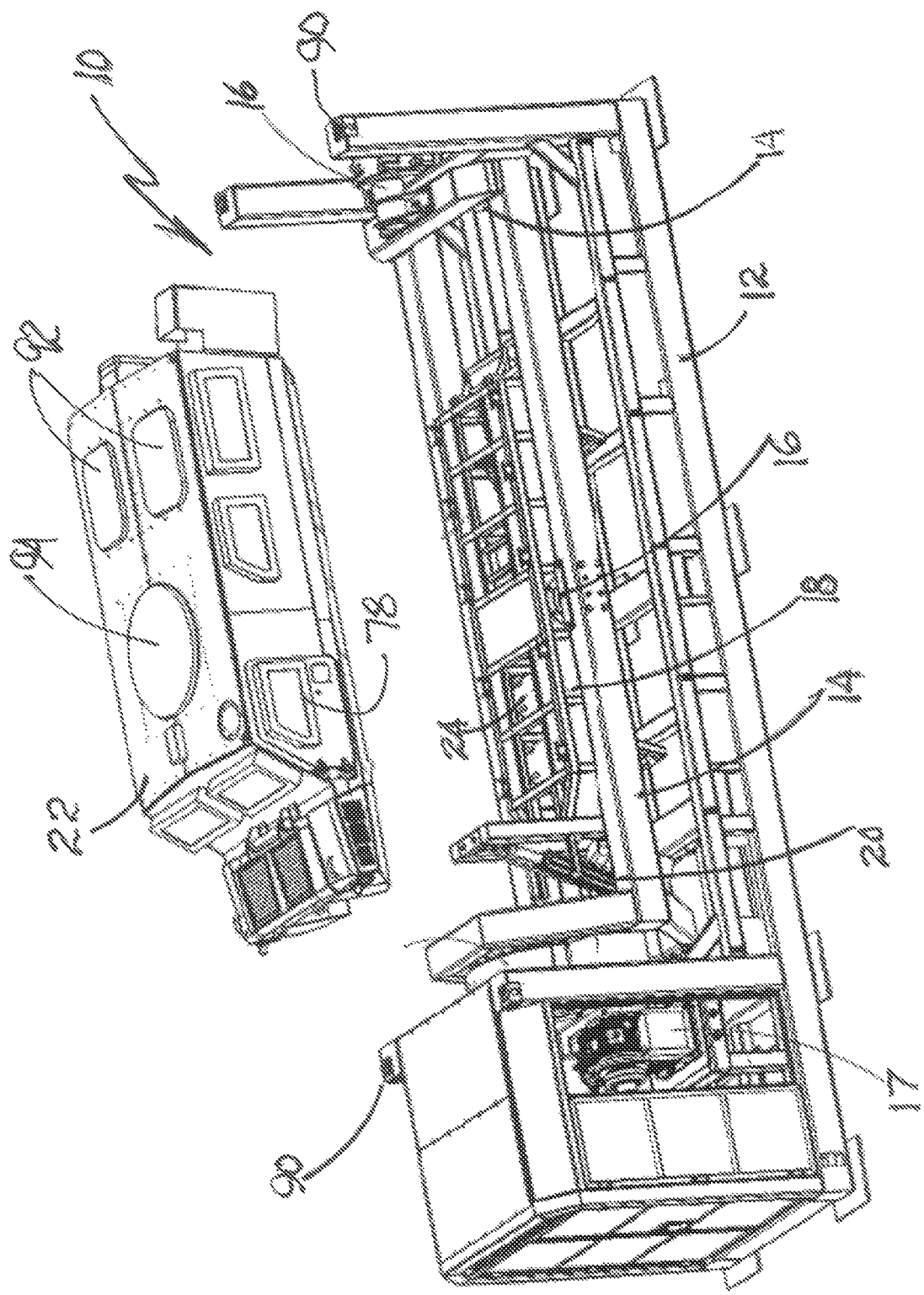
FIG. 5 is an expanded front top perspective view of a vehicle mounted in the simulator showing a variation of the frame construction and surrounding equipment with the test vehicle elevated above.
Figure 6:
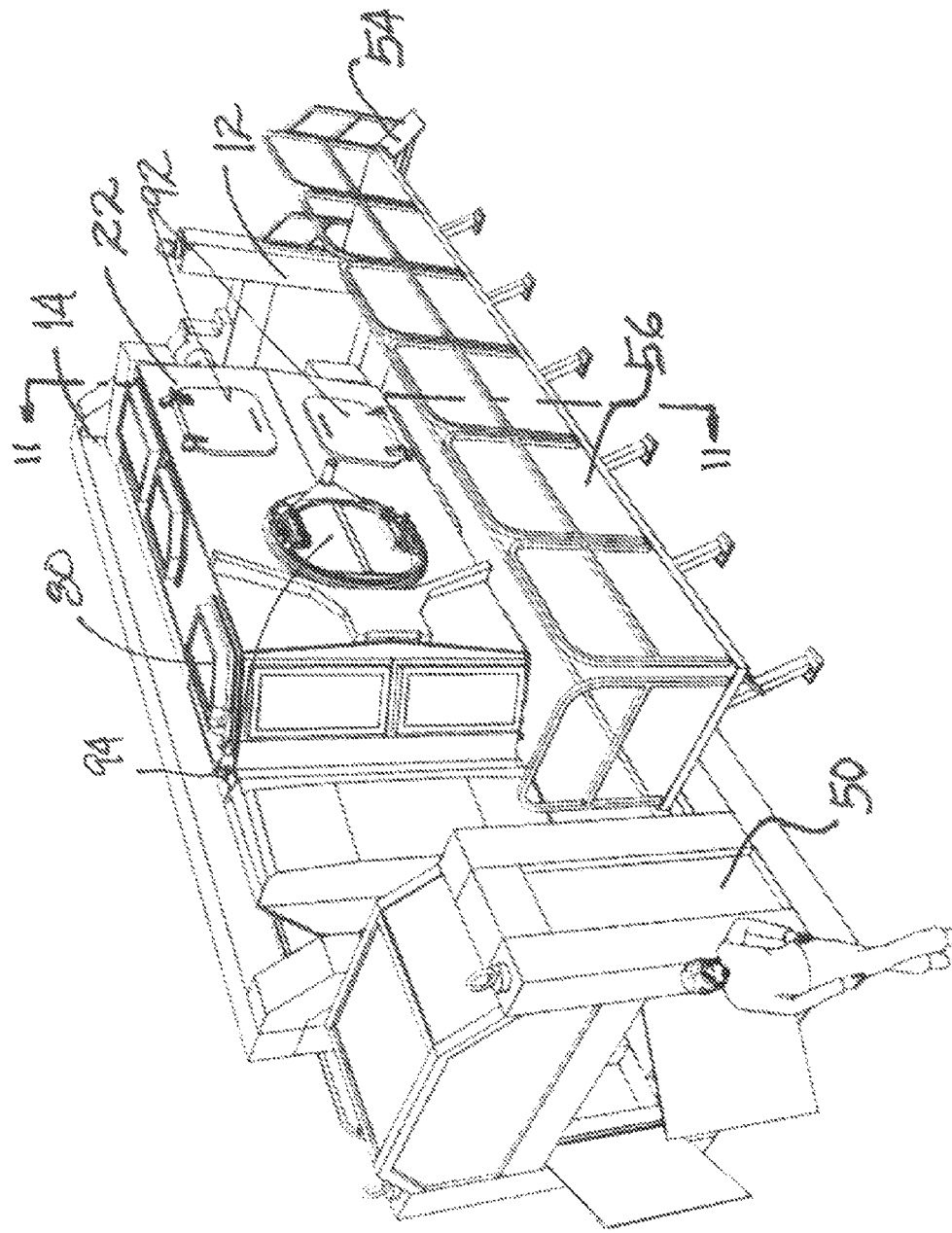
FIG. 6 shows a 90 degree rollover view of the simulator of FIG. 1.
Figure 7:
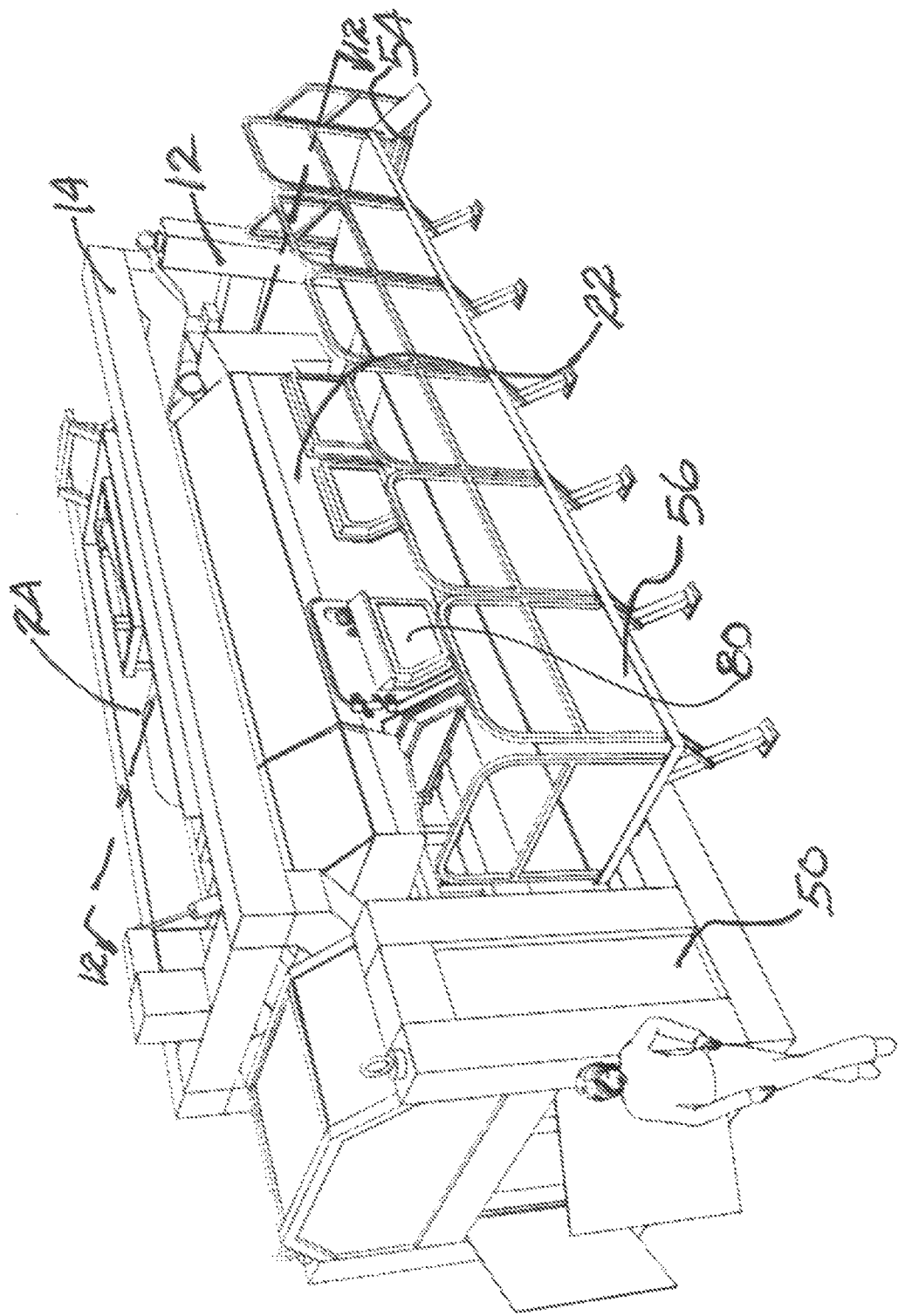
FIG. 7 shows a 180 degree rollover view of the simulator of FIG. 1.
Figure 8:
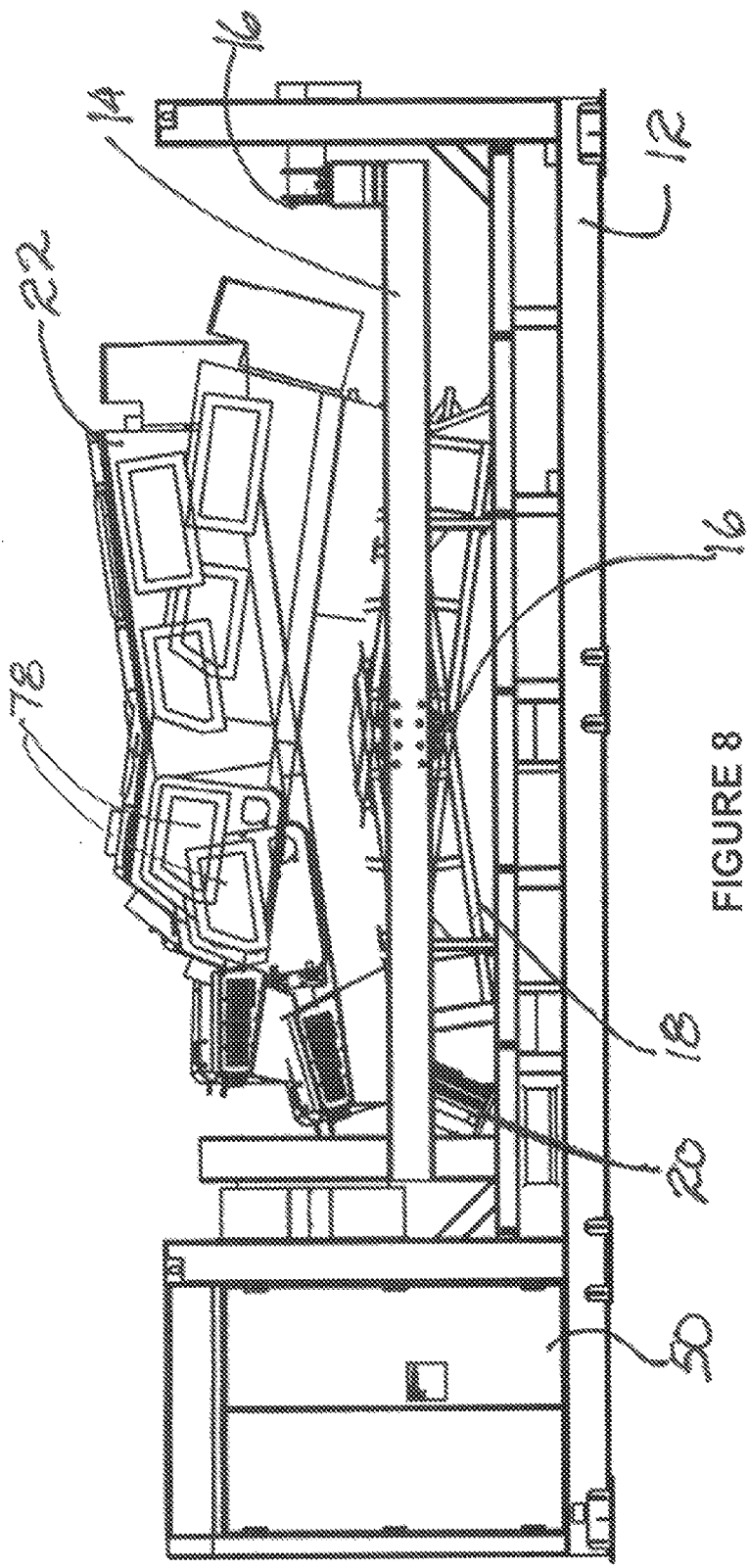
FIG. 8 shows a side view of an embodiment of a vehicle simulator including a simulator frame, but with the steps and platforms removed for visibility, with two superimposed views of the vehicle pitched forward and rearward.
Figure 12:
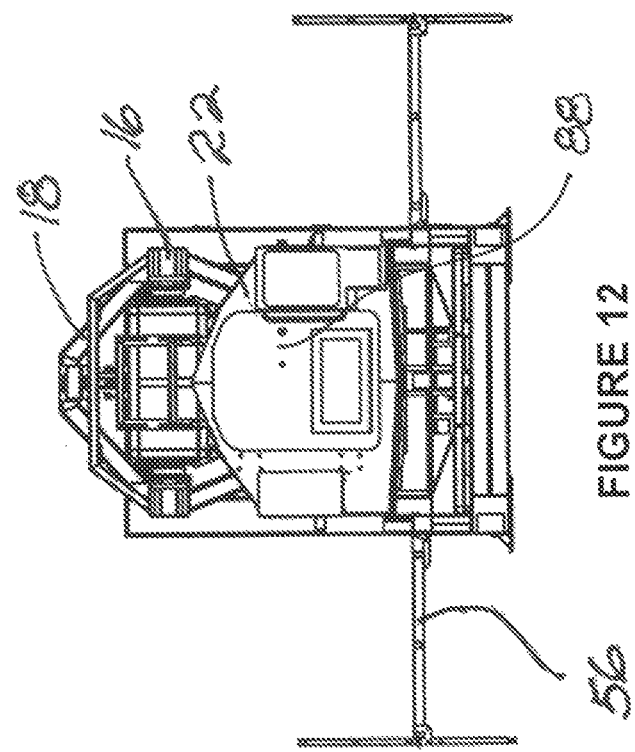
FIG. 12 is an end 180 degree rollover view of the vehicle and frame taken along line 12-12 of FIG. 7.
Figure 11:
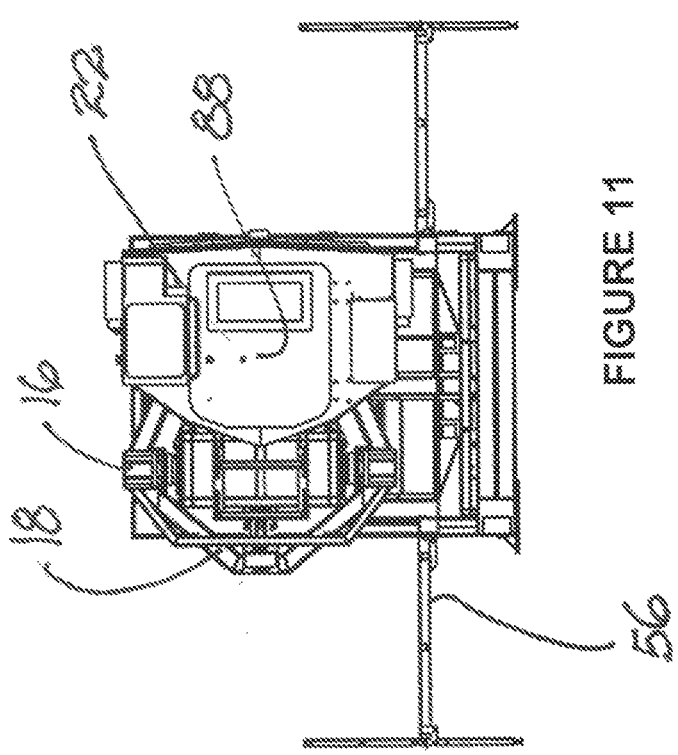
FIG. 11 is an end 90 degree rollover view of the vehicle and frame taken along line 11-11 of FIG. 6.
Figure 13:
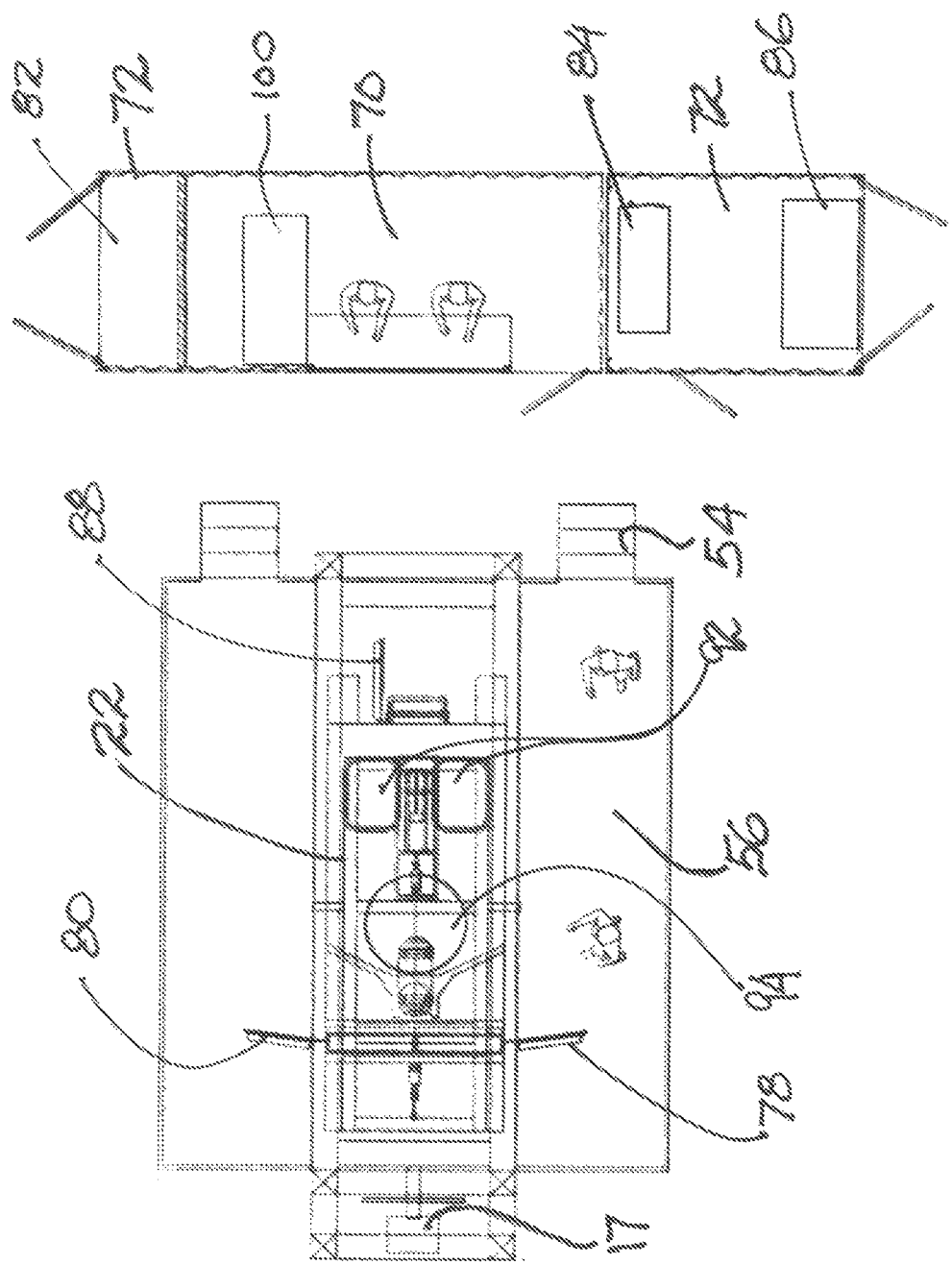
FIG. 13 is a top view showing the vehicle simulator with a simulator frame along with a schematic representation of a control room.
Figure 14:
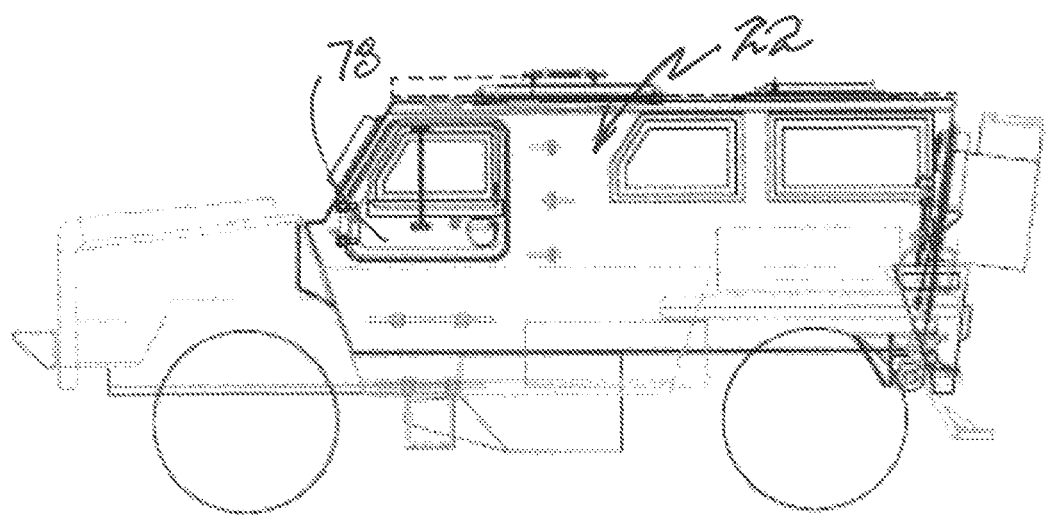
FIG. 14 is a side view of a vehicle which is the subject of the training simulator.
Figure 15:
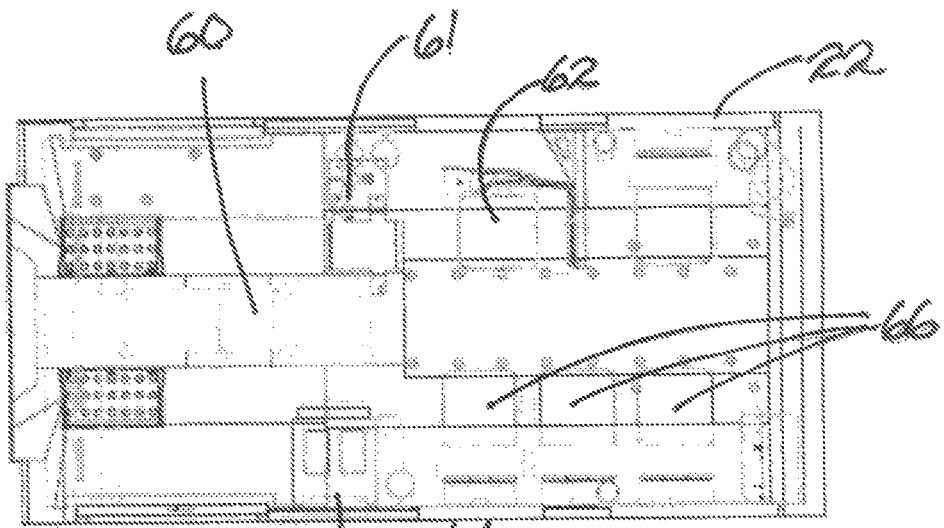
FIG. 15 is a cross sectional view showing of the floor of the interior of the vehicle simulator.
Figure 16:
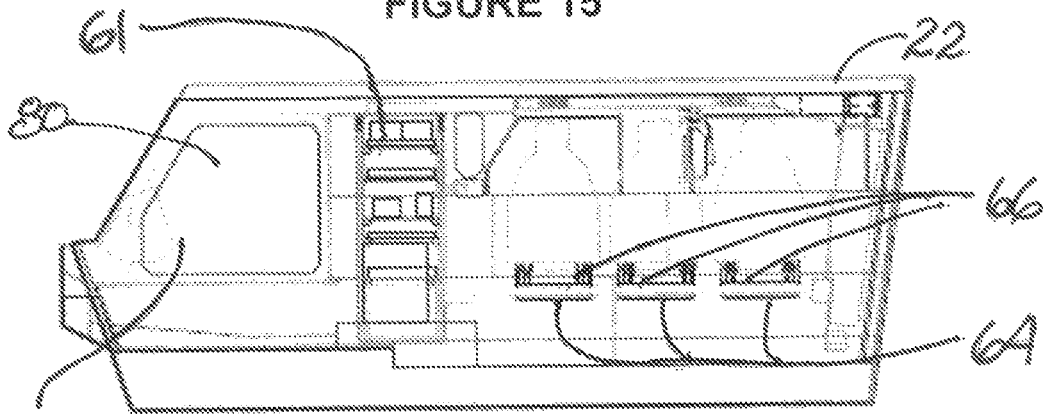
FIG. 16 is a cross sectional view showing a first wall of the interior of the vehicle simulator on the passenger side.
Figure 17:
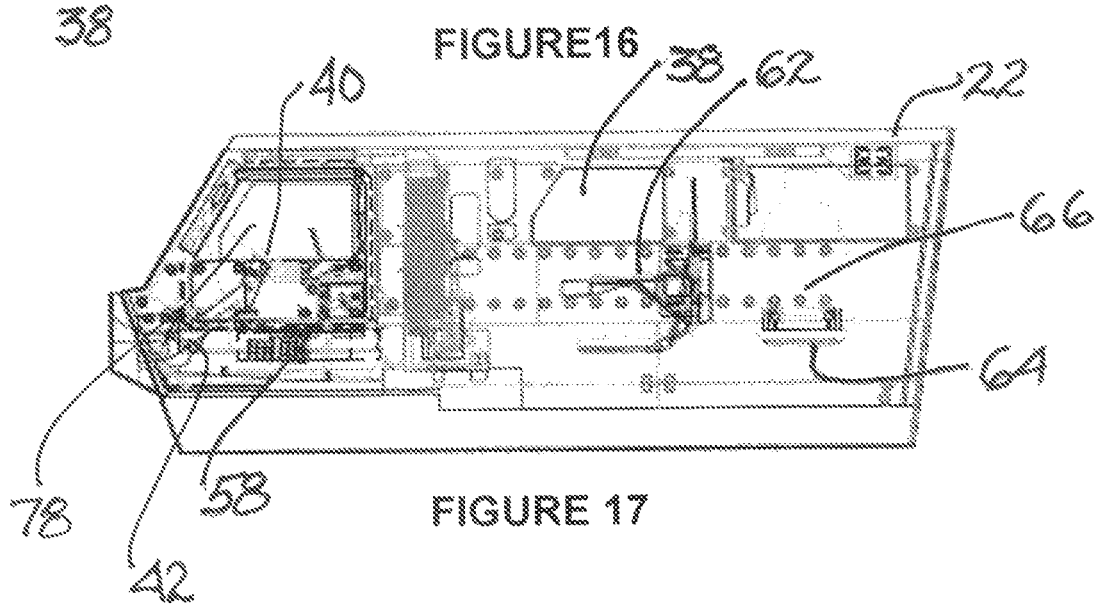
FIG. 17 is a cross sectional view showing a second wall of the interior of the vehicle simulator on the driver sider side.
Figure 18:
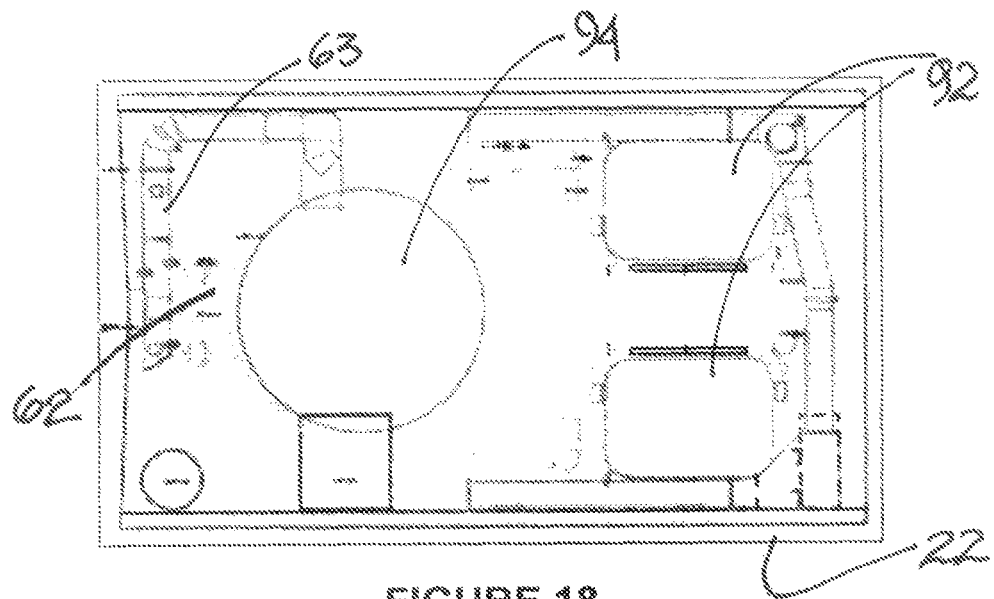
FIG. 18 is a cross sectional view showing of the roof of the interior of the vehicle simulator.
Figure 19:
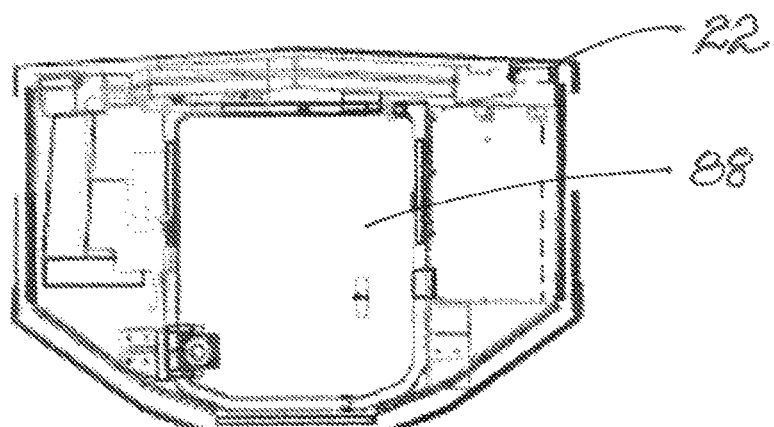
FIG. 19 is a cross sectional view showing of the rear wall of the interior of the vehicle simulator.
Figure 20:
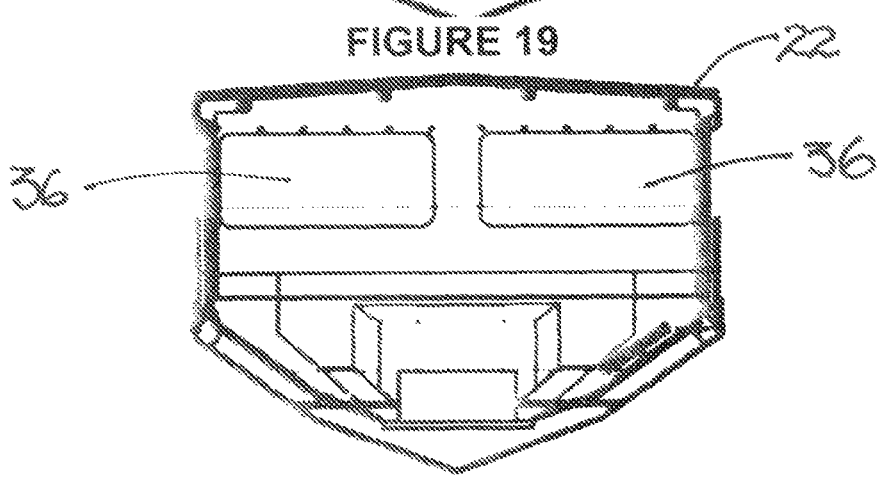
FIG. 20 is a cross sectional view showing of the front of the interior of the vehicle simulator.
Figure 21:
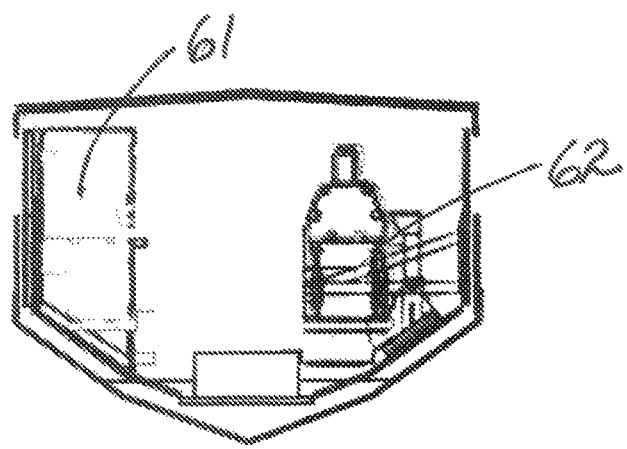
FIG. 21 is a cross sectional view looking forward showing a gunner positioned midway in the interior of the vehicle simulator.

The TRICT 10 consists of a supporting structure or frame 12 to which a high fidelity replica (substantially identical to the actual vehicle) of a vehicle 22 (e.g., the MRAP vehicle) is mounted. The Mine Resistant Ambush Protected (MRAP) vehicle comprises a family of armored fighting vehicles designed for the U.S. Army and United States Marine Corps with the goal of surviving IED attacks and ambushes. While there is no common MRAP vehicle design and there are several vendors, each with a competing entry, the TRICT 10 is designed to accommodate any variation. The description herein below is directed to a particular MRAP embodiment but is not intended to limit the scope of the utility of the TRICT and the implementation as applied to a MRAP.

The supporting structure includes a frame 12 supporting the vehicle 22 that can pitch forward or backward, preferably 8° in either direction; however, a greater pitch can be used to simulate steep hill climbing or descent. The entire MRAP frame and the cab including the MRAP vehicle bearings, forward and rear, are mounted on the TRICT frame 12 so that the total normal vehicle and interior operation can be simulated. Mounting on the TRICT frame 12 allows the entire MRAP, in a preferred embodiment, to be rotated around the roll axis, for a full 360° in either direction, to simulate a vehicle rollover event. However, other embodiments provide for multiple 360° turns to simulate rolling over more than once. Electrical motors 17 and actuators 20 that drive the pitching and rolling motions of the vehicle 22 are enclosed in a large housing 50 in front of the forward main (roll axis) bearing 52 and within the frame 12. Steps 54 at the rear end of the frame 12 lead up to access platforms 56 which extend along the length of and on both sides of, the vehicle 22. An enclosure 72 located at the rear end of the TRICT 10 houses equipment used to control and monitor the vehicle simulation. The interior of the vehicle cab contains equipment and features that are substantially identical to the actual vehicle, including the driver's station 58 and Truck Commander stations 60, computer/electrical equipment racks and communications equipment 61, a CROWS II control console 62, crew seats 64. Flat panel video monitors 36 are mounted in place of all windows 38 in the vehicle cab. In addition to the pitch and roll motion and the video monitors, realism of the simulation is enhanced by a compressed air system connected to thematic devices that produce vibrations and sound effects to mimic weapons firing and impacts on the vehicle exterior. An audio transducer device referred to as the "ButtKicker LFE" 64 (low frequency effects) is located under each passenger seat 66 (in the embodiment shown there are 5 seats) as well as under the driver and vehicle commander's seat. The ButtKicker LFE 64 is a "Silent Subwoofer" that allows the listener to feel powerful bass without excessive volume. Vehicle motion, video displays, and sound effects are all synchronized through the system's software and controlled at the free-standing Instructor Station 70 situated behind the TRICT simulator. By detaching the two sets of steps 54 and folding the access platforms 56 up and securing them along either side of the vehicle 22, the TRICT 10 is designed to be transportable using two flatbed trailers much like that used to transport the actual MRAP vehicle.

The TRICT 10 comprises a motion controlled roll over cradle 14 and base 12 that has the capability to accept different types of Military and Civilian vehicle bodies (RG31, RG33, MATV, HMMMV etc.) 22 and provide simultaneous training for the various crew positions including, but not limited to:

a. Driver training.
b. Truck commander training.
c. CROWS gunner training.
d. Grenade launcher training.
e. Radio operators training.
f. FBCB2 training.
g. Jammer training.
h. Crew training.
i. Roll over and egress training.
j. Hatch Lighting and Orientation System (HALO) and Helicopter Emergency Egress Device (HEED) (initially developed for helicopters for underwater escape) training.

Vehicle Crew Trainer—In the present described embodiment the TRICT 10 incorporates a Mine Resistant Ambush Protected (MRAP) vehicle Crew Trainer designed to provide a fully immersive environment for training vehicle crews in a wide range of scenarios and hostile situations, to include ambush and Improvised Explosive Device (IED) events. The training environment includes, but is not limited to, simulation capability for vehicle roll over training, crew coordination training, training for all communications/radio systems, FBCB2, jamming equipment, CROWS weapon systems, mission rehearsal drills, mission load out training, heat detection systems, and HALO lighting systems. The TRICT simulator for vehicle personnel training is fully networked and integrated with appropriate operation and control software, providing an immersive, realistic experience for vehicle crews. Vehicle crews generally comprises a team of individuals including some or all of a driver, a crew commander, a CROWS operator, a radio operator, a navigator, a fire control individual, a medical support individual and individuals who may also include backup or alternate support for the team members as well as individuals trained to handle multiple tasks. The simulation vehicle includes all of the equipment necessary for each individual to simultaneously receive full operational training as to their individual function. The TRICT also includes capability for simulating roll over events and allows vehicle crews to train on emergency egress procedures.

CROWS Trainer—Also included is a CROWS Trainer (Common Remotely Operated Weapon Station) that includes all menus, switchology, controls, and displays for current and future versions of various weapon systems. The training system will operate both in conjunctions with the virtual environment that the vehicle training system is using, or as a standalone CROWS system trainer. CROWS is a turret mounted atop a vehicle that the soldier operates from within his vehicle. Typical CROWS-mountable vehicles include Max Pros, RG-31s, Fox vehicles, certain tanks and Buffalos. Guns typically mounted into the CROWS include, but are not limited to the .50 caliber M2, MK19, M240B and M249.

Prior available simulators for training equipment operators (referred to as users or team members for explanation purposes) are generally limited to specific tasks performed at a particular work station and the user is typically responding to situations or stimuli programmed by a supervisor operating input equipment (referred to as the input operator for explanation purposes) to provide the stimulus which the user must respond to. While simulators are available for training individuals in specific tasks, simulation systems are rare or nonexistent where two different users performing different functions must simultaneously respond to a single set of operating conditions provided by the input operator. Simultaneous team training with team members having different tasks, but with each team member responding to the same external conditions are, to applicant's knowledge, not generally available. Still further, in the presently described TRICT simulator, it is not necessary that the input operator provide all of the simulation input. Instead, the input operator establishes the surrounding environment (i.e., the road or terrain conditions, the weather, the tactical environment such as third party activity, weaponry or IED placement, etc.). The input operator may also establish a training situation or scenario. However, the team, by the action of one or more of its members, may be the activating factor. For example, the MRAP commander or driver may either activate or avoid an event by their action (i.e., driving over a paved road versus leaving the road and proceeding across surrounding terrain), which may in turn activate a preprogrammed event. The simulator provides a simultaneous and interactive operation and training of the vehicle occupants for normal operation. Should an event occur, not within the normal or routine operation of the vehicle being simulated, once something unintended or not normal occurs all team members are then required to perform their function in interaction with the activities of the other team members. As such the TRICT described herein provides a real life situation for training all of the team members in their individual responsibilities which in turn requires the interaction of each of the team members and also provides training of team members in responding to and dealing with actions of other team members.

The TRICT 10 simulator described herein and incorporating features of the invention integrates all specific training tasks into one simulator, and provides a realistic vehicle simulation by using a motion controlled base unit with roll over capabilities. It also is outfitted with special effect features that further enhance the training by simulating road noise, ambient sounds, explosive detonations, machine guns, grenade launchers, air pressure changes and may also be supplemented to include other ambient and surrounding conditions.

Referring to the Figures, the TRICT system 10 consists of a structural base frame 12 that functions as a bed for the motioned controlled roll over axis cradle 14. The roll over axis cradle 14 has the capability to rotate from 0 degrees to 360 degrees in both directions using large bearings 16 located at the front and rear of the frame 12. The speed of the roll over function is controlled by an electrical motor 17 which is located in a housing 50 at the front of the TRICT 10. The motioned controlled roll over axis cradle 14 functions as a bed for the motioned controlled pitch axis cradle 18. The pitch axis cradle 18 has the capability to pitch up and down in both directions by using an electrical motor powered linear actuator 20 and a large centrally located bearing 16. By combining the motion of these components a driving simulation is created. These motions are capable of simulating driving through all terrains, various non-level configurations that might be encountered and rolling the vehicle in both directions. This includes operation of the roll over cradle and pitch cradle, with or without other effect devices, to simulate a vehicle traveling over any combination of a flat, sloped, hilly paved and unpaved surfaces. When combined with the various effects and the LED displays, operation in various different weather conditions is also simulated.

Custom vehicle bodies 22 replicating various vehicles including, but not limited to, the MRAP, MATV and HMMWV's and including the features described herein are then fitted onto the motion controlled roll over axis cradle 14. These vehicle bodies have a very high interior fidelity level such that they substantially replicate or simulate the actual operable vehicle for which training is desired.

Figure 22:
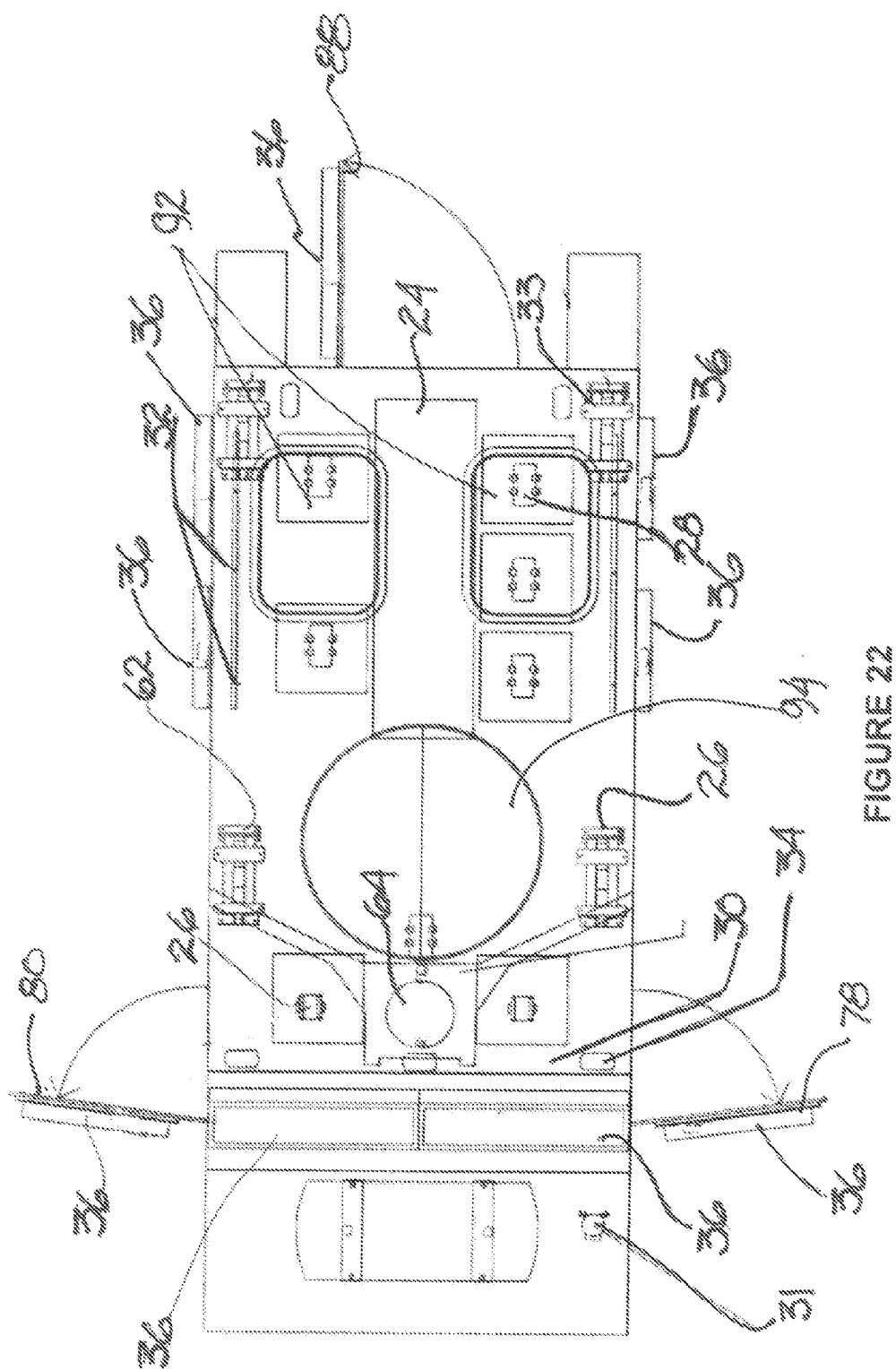
FIG. 22 is a schematic view of the simulation vehicle show the location of various special effects applied thereto.

Referring to FIG. 22, to further enhance the training, custom special effects are incorporated to simulate IED explosives 24, machine gun sound and vibrations 26, road noise and vibrations 28, force feedback driver controls 30, change in air pressure 32, bullet impact effects 33 and surrounding sound 34. These effects are mounted in various locations on the motioned controlled roll over axis cradle 14 and on and/or in the customized vehicle body 22. By using these effects individually or together the training enhancement can be custom tuned to fit each training application as well as different combat, geographical, regional and climate situations. These effects are shown in representative locations in FIG. 22 but they can be mounted at various locations on or around the vehicle 22 to obtain the best effect. Also, various effects may require multiple placements.

LCD monitors 36 are positioned in the windows 38 (the front two window positions, driver door 78 and passenger door 80 positions, rear driver and passenger window positions and the rear Door Window 88) of the vehicle body 22 to display computer generated training environments that can be changed out depending on geographic requirements.

The steering wheel 40 is a force feedback steering wheel system 30 with pedals 42.

The TRICT system 10 is constructed out of appropriate materials such as steel, aluminum, plastics, wood, fabrics, etc. The roll over and motion controlled base can be operated using one, all or some of various mechanical components which are selected based on the intended task of each including, but not limited to servo motors, linear actuators, hydraulics, pneumatics, DC motors, AC motors, bearings, gears and sprockets as well as appropriate software to drive the simulation.

Non-Active Physical Components can include various different accessories that might be included in the operation vehicle such as high interior fidelity, faux power inverters, AC/heating system 82, standard manual extinguishers or automatic fire extinguishing system, compressed air dispersed from cylinder for audible effect, most of which are not shown in the figures so as not to clutter the images.

Active Physical Components Include:
  a. Rear Cab Door 88—Door can be operated by inside and outside control of pneumatic actuator including a manual lever that must be opened before pneumatic actuator can open door. However, for safety there is nothing that will prevent the pneumatic actuator from triggering before the manual lever has been opened.
  b. Operable Driver 78 and Passenger Doors 80—two Roof Hatches 92 and a Turret Hatch 94 simulating or duplicating normal operation, rotation and resistance to opening.
  c. The driver station 58 and crew seats 66—exact replicas of operable vehicle and are all provided with fully functioning 5 point seat belts/harnesses.
  d. CROWS control console 62 and gunner position—provided with realistic CROWS display. Mounting brackets are provided to include space/access for ease of installation/removal of CROWS. Also included is an articulating arm 63 allowing for manual positioning of CROWS display/controller.

Space is provided for mounting of FBCB2 (Force XXI Battle Command Brigade and Below display (FBCB2 is a Solaris based communication platform designed for commanders to track friendly and hostile forces on the battlefield), radio rack 61 that is compatible with radio equipment, including 15 amp Edison duplex receptacle in close proximity to rack 61 and data connection points in close proximity to the rack. Also provided is space for Jamming Equipment next to the radio rack.

Supplemental equipment also includes, but is not limited to an Intercom System, Interior curtains and shades, Window shades, a Hanging Curtain between driver/passenger position and CROWS Gunner, Running Lights, Manual operation of cab dome lights via "Cab Dome" switch and a "Crew Dome Override" switch on dashboard.

The simulator operation station 70 located rearward of the TRICT 10 provides the operator with the ability to see and communicate with personnel in the simulation vehicle (i.e., the MRAP) during training. Also included is an MRAP Sound System with an integrated surround sound speaker system 34 having Butt Kicker 64 effects for low frequency response.

For Roll Over Training, the simulator has the ability to rotate the vehicle from 0-180 degrees in two directions and to roll and stop in any desired position in the 360 degrees of rotation, the primary training positions being at 90, 180, and 270 degrees. In addition, the simulator has the capability to simulate the Hatch Lighting & Orientation System (HALO) for crew training for escape from the vehicle in rollover or underwater situations.

In a typical training situation, the simulator will be entered with the vehicle in a normal horizontal orientation. However, exit from the vehicle from all internal locations is provided at any of the various roll over orientations.

Full simulation of various encountered driving situations is provided to the vehicle operator, including steering wheel with force feedback, gas and brake floor pedal operation, normal brake pedal resistance. The Motion Control System also provides capability of simulating driving through different types of terrain, up and down small hills, over curbs, rocks and other types of debris with the gas and brake pedal operation.

The fully functioning dashboard includes simulation of all normal instruments including an ignition switch control panel with On/Off and/or Start/Run/Off positions, glow plug indicator light, a transmission button control panels with segment display gear indicator and select & monitor indicators on the side of segment display as well as Lo Speed Switch to indicate LO SPD as well as Neutral Indicator Light along with appropriate indicator lights, a speedometer which will appropriately communicate speed traveled during simulation as well as a tachometer which will communicate RPM of engine during simulation, a parking brake which will engage the parking break for training purposes, an AWD (all wheel drive) switch with AWD engage indicator lights, rear and front differential switch with engage and or disengage indicator lights, and an exhaust brake switch with indicator lights.

Other features which may be displayed but are not necessarily functional can include example rear door switch, winch, left scene lights, right scene lights, light control panel, dashboard indicator lights, oil pressure gauge, temperature gauge. battery voltage gauge, gauge to left of battery voltage gauge, pressure gauges, left and right fuel tank indicators, trailer air supply, internal fuel tank selection, fire suppression control panel, air conditioning control panel, fuel tank selection, searchlight controller and a heating control panel. As a result, once the crew enters the simulator and the doors are closed they will not be able to notice a difference in operation of the simulator from the actual vehicle.

Referring to FIG. 22, to further simulate actual operational conditions encountered when the vehicle travels across a typical terrain and/or encounters typical battlefield conditions or transport through a hostile environment various special effects are included in or on the simulation vehicle These effects include, but are not limited to, a turret with a machine gun or other weaponry, rpg impact, air blast, bullet impact, vibration motors, butt kickers, several lcd screens and force feedback steering wheel and pedals.

Support and operational control of the simulator is provided from a separate, but preferentially adjacent free standing control room, thus providing to the simulator operators and training a place to sit and monitor the operation and the ability to see and communicate with personnel in simulation vehicle during training. External equipment to the simulator includes door lock/unlock capability, air conditioning, heating and/or other environmental conditions (gas or biological simulation), lighting and power supply, audio control, as well as audio and video monitoring equipment for Observers and trainer to monitor what is occurring within the simulator.

The Systems support Room provides space for various auxiliary equipment necessary for operation of the simulator and all of its functions including, but not limited to, power generators or power supply equipment, motors and drive systems, compressor to provide air for hydraulics and all the necessary electrical, hydraulic, HVAC lines for proper functioning of the simulator.

Referring specifically to the Figures, the major components of the system are the main structural frame, engine room, motion controlled roll over axis cradle, motion controlled pitch axis cradle, pitch bearings, roll over motor and gearbox, roll over effect bearing, roll over effect slewing ring, pitch axis linear actuator, air supply tank for simulation effects, IED effect component, crane lifting points (4 total) 90, egress tunnel, the vehicle body and computer control system 100 located adjacent to the Instructor control station 70.

One skilled in the art, based on the teachings herein, will recognize that the TRICT described herein is not intended to be limited an MRAP and is applicable to other land vehicles (tanks, armored assault vehicles, troop carriers, etc). Additionally, the teachings herein and the design concepts described are likewise applicable to water craft or aircraft. One skilled in the art will further recognize that, based on the teachings herein, a computer control system including software suitably programmed, with or without additional manual controls, can be provided to provide the input to the various components and features of the simulator to accomplish the intended vehicle operational simulation.

I claim:

1. A system for simulating the operation of a vehicle, all operational tasks within the vehicle, and a surrounding real environment to a team of several individuals within the vehicle, the several individuals having different functional responsibilities for the operation of the vehicle being simulated comprising:
   a support frame having a forward and rear end,
   a roll over cradle moveably attached to the support frame through first and second bearings in the support frame front and rear portions,
   a pitch cradle moveably mounted on a roll over cradle to provide front, rear and sideways rocking motion,
   a simulation vehicle that is substantially the same, at least in its interior, as the vehicle being simulated including operational equipment duplicating or simulating the equipment that each team member would use in performing their individual team function, the simulation vehicle mounted on the pitch cradle,
   a steering wheel, brake and gas pedal system including a force feedback mechanism which simulates operation and all possible a movement of the vehicle over the terrain in conditions being simulated,
   effect devices mounted in or on the simulation vehicle to provide to the individuals in the simulation vehicle various environmental effects and
   a computer based system programmed for controlling the operation of the rollover cradle, pitch cradle, simulation vehicle, all operational or simulation equipment and effect devices such that the system provides to all of the individuals within the simulation vehicle the same visual, sound, tactile and operational experience as if they were in the actual vehicle traveling in the real environment being simulated
   wherein the computer based system is programmed to provide said simulated action to, and receive responsive input from, each said individual, said responsive input of each individual modifying the simulated action provided by the computer based system so that all of the team comprising several individuals can receive and continuously respond on a real time basis to all externally generated simulation as modified by the team generated response actions thereto such that input from each individuals in the team within the simulation vehicle in response to externally generated simulation as well as modifications thereof generated by the other team members responsive thereto continuously modify one simulated operation of the vehicle.

2. The system of claim 1 wherein the roll over cradle is controlled to rotate around the bearings at least 360° to provide to individuals in the simulation vehicle training in regard to an actual vehicle rollover event on any simulated terrain.

3. The system of claim 1 wherein pitch cradle is controlled to pitch the simulation vehicle at least about 8° forward and backward to provide to individuals in the simulation vehicle a realistic experience of traveling over sloped terrain.

4. The system of claim 1 wherein the roll over cradle, pitch cradle and steering, brake and gas pedal system, with or without other effect devices, operate to simulate a vehicle traveling over any combination of a flat, sloped, hilly, paved or unpaved surfaces and rocks, debris and other commonly encountered terrain features under various simulated weather conditions.

5. The system of claim 1 wherein the team of individuals includes one or more of a driver, a crew commander, a CROWS operator, a radio operator, a navigator, a fire control individual, a medical support individual and individuals to provide backup or alternate support therefore and the simulation vehicle includes all of the equipment necessary for each individual to simultaneously receive full operational training as to their individual function or functions in response to both internal and externally generated input.

6. The system of claim 1 wherein effect devices comprise one or more of video monitors, LED displays, a compressed air system, vibrations and sound effects devices, weapons firing and vehicle impacts effects, audio transducer device to provide low frequency effects, and motion simulation effects, the various effects being synchronized through system software to simulate actual training situations.

* * * * *

UNITED STATES PATENT AND TRADEMARK OFFICE
CERTIFICATE OF CORRECTION

PATENT NO.       : 8,758,016 B1
APPLICATION NO.  : 13/031026
DATED            : June 24, 2014
INVENTOR(S)      : Ulf Henriksson It is certified that error appears in the above-identified patent and that said Letters Patent is hereby corrected as shown below:

In the claims:

Col. 8, Claim 1, Line 35, between "possible" and "movement" please delete the "a"; Col. 8, Claim 1, Line 57, please delete "individuals" and replace with the singular —individual—

Signed and Sealed this
Twenty-third Day of September, 2014

Michelle K. Lee
*Deputy Director of the United States Patent and Trademark Office*